United States Patent [19]

Bilger et al.

[11] Patent Number: 5,055,283
[45] Date of Patent: Oct. 8, 1991

[54] METHOD OF REMOVING SODIUM POLYSULFIDE FROM USED SODIUM/SULFUR BATTERIES

[75] Inventors: Edgar Bilger, Hasselroth; Urban Gubisch, Gelnhausen, both of Fed. Rep. of Germany

[73] Assignee: Degussa Aktiengesellschaft, Frankfurt am Main, Fed. Rep. of Germany

[21] Appl. No.: 627,820

[22] Filed: Dec. 14, 1990

[30] Foreign Application Priority Data

Dec. 22, 1989 [DE] Fed. Rep. of Germany ....... 3942516

[51] Int. Cl.$^5$ .................... C01B 21/093; C01C 3/20; C01D 1/32; C22B 26/10
[52] U.S. Cl. .................................. 423/366; 423/189; 423/205; 429/49
[58] Field of Search ............... 23/295 R; 75/639, 694; 210/752; 423/88, 366, 642, 578 R, 567 A, 205, 189; 429/104, 49

[56] References Cited

U.S. PATENT DOCUMENTS

| | | | |
|---|---|---|---|
| 3,459,498 | 8/1969 | Johnson | 423/366 |
| 4,024,229 | 5/1977 | Smith et al. | 423/642 |
| 4,290,192 | 9/1981 | Elkins | 429/104 |
| 4,391,632 | 7/1983 | Aaltonen | 75/694 |
| 4,414,022 | 11/1983 | Melcher | 75/639 |
| 4,477,323 | 10/1984 | Esna-Ashari et al. | 23/295 R |
| 4,508,683 | 4/1985 | Doll et al. | 210/752 |
| 4,578,254 | 3/1986 | Malmström | 423/88 |
| 4,719,019 | 1/1988 | Vasan | 210/752 |
| 4,801,443 | 1/1989 | Simek | 423/578 R |
| 4,977,044 | 12/1990 | Ludwig | 429/104 |

*Primary Examiner*—Gary P. Straub
*Assistant Examiner*—C. Robert Chen
*Attorney, Agent, or Firm*—Beveridge, DeGrandi & Weilacher

[57] ABSTRACT

A method for removing sodium polysulfide from used sodium/sulfur batteries provides that the cells are granulated under protective measures, the scrap is treated in a solution of sodium cyanide and the solution obtained is treated with air. The solution then contains sodium thiocyanate and sodium hydroxide, which latter can be reacted by means of $CO_2$ to $Na_2CO_3$, precipitated and separated.

12 Claims, No Drawings

METHOD OF REMOVING SODIUM POLYSULFIDE FROM USED SODIUM/SULFUR BATTERIES

BACKGROUND AND INTRODUCTION

The present invention relates in its broadest aspects to waste management of sodium polysulfides, and more particularly to a method of removing sodium polysulfide from used sodium/sulfur batteries with the recovery of an alkaline sodium thiocyanate solution. Sodium thiocyanate is used, among other applications, in the chemical and the pharmaceutical industry for the production of organic thiocyanates, isothiocyanates, mustard oils, herbicides, pesticides and biocides; in the photo industry for coloring, sensitizing and stabilizing and for the production of brighteners in electroplating.

No method is known in the literature for the removal of sodium polysulfide from Na/S batteries with the simultaneous recovery of sodium thiocyanate.

SUMMARY OF THE INVENTION

An object of the present invention is to remove sodium polysulfide from used sodium/sulfur batteries with the recovery of an economic material; namely, sodium thiocyanate in the form of an alkaline or soda-alkaline solution.

The above and other objects of the invention are achieved according to one aspect of the invention by carrying out a process of mechanical comminution, or crushing, of the batteries or of the sets of cells removed from the battery housings and containing sodium polysulfide and, optionally, sodium remnants to a sufficient degree to produce a finely divided scrap of up to 30 mm particle diameter. The scrap particles are then treated with an aqueous sodium cyanide solution, the cyanide content thereof relative to the total sulfur present expressed as $S^0$ or $S^{-2}$ being 1 : 1. Agitation is employed for this process. Separation of the insoluble components of the scrap from the solution is then carried out. The solution remaining after separation of the solid scrap components is then contacted with 0.1 to 20 % by weight, relative to the total sulfur, of manganese dioxide as a catalyst and the sulfidic sulfur is selectively oxidized by passing air though the reaction zone at temperatures in a range from room temperature to 110° C. This results in the intermediate formation of elementary sulfur which is caused to react with the residual sodium cyanide present in the solution to thereby form sodium thiocyanate as the desired product.

The important steps in this aspect of the invention are the shredding of the used batteries to form a finely divided scrap, the charging of the scrap into an aqueous solution of sodium cyanide and reacting the components with utilization of the heat of reaction, the separating of the non-reacting components, the selective oxidation of the sulfidic sulfur to form elementary sulfur and an in-situ reaction with free sodium cyanide to form the desired sodium thiocyanate. The selective oxidation of the sulfidic sulfur in the presence of manganese dioxide and the use of air as the oxidation agent are especially significant for the process.

According to an alternative aspect of the invention, the same problem is solved by means of a mechanical comminution, or crushing, of the batteries or of the sets of cells removed from the battery housings and containing sodium polysulfide and, optionally, sodium remnants to a sufficient degree to form a fine scrap of up to 30 mm particle diameter. The resulting finely divided scrap is mixed into an aqueous sodium cyanide solution, the cyanide content of which relative to the total sulfur present expressed as $S^0$ or $S^{-2}$ is 1 : 1. Agitation is employed in this process. The resulting mixture is contacted with 0.1 to 20 % by weight, relative to the total sulfur, of manganese dioxide as catalyst, and a selective oxidization of the sulfidic sulfur is carried out by passing air through the reaction zone. Temperatures in a range from room temperature to 110° C. are used. This results in the intermediate formation of elementary sulfur which reacts with the residual sodium cyanide present to form sodium thiocyanate. The insoluble components are separated from the aqueous solution of the sodium thiocyanate product.

Thus, in this somewhat altered second method of the invention, sodium cyanide solution in a receiver is mixed under agitation with the scrap and the catalyst and is allowed to react. Then, the oxidation by air is carried out and, finally, the insoluble substances are removed from the solution of the sodium thiocyanate product that is produced.

In each of the two methods described above, aqueous sodium cyanide solutions with a content of 15-35 % by weight are used; the concentration is preferably 20-30 % by weight.

The reaction of the polysulfide with the cyanide is exothermic in each instance. A supplemental heating to boiling temperature is advantageous. In order to carry out the reaction of the formally zero-valent sulfur with the sodium cyanide in a quantitative manner, it proved to be advantageous to maintain a postreaction time of 1–40, preferably 5–30 minutes at reflux temperature. After the end of the reaction of this sulfur component, the sulfidic sulfur is selectively oxidized to sulfur by means of blowing air through the reaction mixture in the presence of the catalyst and converted in situ with free sodium cyanide to sodium thiocyanate.

A number of advantageous modifications, which are presented below, can be used in like manner for each of the above described methods:

Thus, it has proven to be advantageous if the mechanical comminution of the batteries or of the sets of cells takes place under an atmosphere of water vapor or under inert gas.

The batteries or the sets of cells are preferably comminuted to form a crushed scrap with a particle diameter of less than 10 mm.

In order to intensify the action of the sodium cyanide solution on the scrap, the scrap can be treated with the solution or (when working according to the second method of the invention) with the solution in the presence of the catalyst with supplemental heating to the boiling temperature.

The use of 2-7 % by weight catalyst relative to the total sulfur has proven itself especially well suited for purposes of the invention.

The turbulent motion produced by the blowing of air into the reactor volume is generally sufficient for the selective oxidation of the sulfidic sulfur; however, it is even better to agitate the reaction mixture during the blowing through of air.

The selective oxidation of the sulfidic sulfur can be carried out in the most elegant manner at 50°–80° C.

The product solution, which contains the sodium thiocyanate and which can be obtained according to both methods of the invention, is alkaline in nature on account of its sodium hydroxide content. According to an advantageous embodiment of the invention, the alkaline reaction can be reduced if the sodium hydroxide contained in the solution of the sodium thiocyanate product is converted into sodium carbonate by means of passing through or blowing in carbon dioxide and if the carbonate precipitated as a solid or precipitated by cooling is removed from the product solution, which is then soda-alkaline, which can take place by means of filtering.

Thiocyanate yields of up to 98.7 % relative to total sulfur added are achieved when working in accordance with the invention.

The invention is explained in more detail in the following illustrative examples.

DETAILED EMBODIMENTS OF THE INVENTION

Example 1

250 g sodium cyanide 98 % (7 moles) are dissolved in 1150 g water in a three-neck flask provided with agitator, reflux condenser, thermometer, closable infeed pipe and heating hood. Under agitation, 353 g scrap consisting of sets of cells previously shredded in an atmosphere of water vapor with a total sulfur content of 63.6 % by weight (7 moles) are rapidly charged to the flask. As a result of the exothermic reaction, the temperature rises from 25° C. to 95° C. The mixture is heated further until the boiling temperature (110° C.) and agitated for 20 min. The reaction mixture is quickly removed by suction via a filter and transferred into a glass tube fitted with a fused glass frit layer at the bottom. The mixture is compounded with 45 g manganese dioxide ($MnO_2$), heated to 65° C. and 424 liters air (3.98 moles $O_2$) under normal conditions are passed through from below. After the mixture has cooled down to room temperature, 44.8 liters carbon dioxide (2 moles) under normal conditions are passed through the reaction solution from below. As a result, the pH drops from pH 13.5 to pH 8.0. The resulting precipitate settles and is removed by suction. The filtrate contains 6.91 moles sodium thiocyanate =98.7 % yield.

Example 2

150 g sodium cyanide 98 % (3 moles) are dissolved in 550 g water in a three-neck flask fitted with agitator, reflux condenser, thermometer and closable infeed pipe. There is then rapidly charged into the flask 250 g shredded cell material with 38.4 % by weight total sulfur (3 moles) under agitation. As a result of the exothermic reaction that takes place, the temperature rises from room temperature (25° C.) to 93° C. The mixture is heated further until the boiling temperature (110° C.) and agitated 7 min. at this temperature. Then, 0.096 g manganese dioxide, $MnO_2$ are added, and a glass tube with a fused frit at the bottom is introduced into the reaction mixture. Then 200 liters air (1.88 mole $O_2$) under normal conditions are introduced into the reaction mixture at 100° C. through this tube. The hot reaction mixture is vigorously removed by suction, cooled down to room temperature and filled into the glass tube with the frit bottom. Then, 22.4 liters carbon dioxide (1 mole) under normal conditions are passed through the solution from below. The pH drops as a result from pH 13.0 to pH 8.0. The precipitate which settles out as a result is removed by suction. The solution contains 2.79 moles sodium thiocyanate =93.1 % yield.

Further modifications and variations of the foregoing will be apparent to those skilled in the art and are intended to be encompassed by the claims appended hereto.

German priority document P 39 42 516.9 is relied on and incorporated by reference.

We claim:

1. A method for removing sodium polysulfide from used sodium/sulfur batteries with the recovery of sodium thiocyanate solution, comprising mechanically comminuting a used sodium/sulfur battery or cell removed from a battery housing and containing sodium polysulfide and, sodium remnants to produce a finely divided scrap of up to 30 mm particle diameter, treating said scrap with an aqueous sodium cyanide solution to form a mixture, treating said mixture with 0.1 to 20 % by weight, relative to the total sulfur, of manganese dioxide as a catalyst and selectively oxidizing sulfidic sulfur present in said mixture by passing air though at temperatures in a range from room temperature to 110° C. for the intermediate formation of elementary sulfur, and reacting with residual sodium cyanide present in said mixture to form sodium thiocyanate product.

2. A method according to claim 1 further comprising separating insoluble components from the aqueous solution of said sodium thiocyanate product.

3. The method according to claim 1 further comprising after said scrap is treated with said aqueous sodium cyanide solution, separating insoluble components of said scrap prior to treatment with said catalyst.

4. The method according to claim 1, wherein the mechanical comminution of the battery or the cell takes place under an atmosphere of water vapor or under inert gas.

5. The method according to claim 1, wherein the battery or the cell is comminuted to scrap with a particle diameter less than 10 mm.

6. The method according to claim 1, wherein the scrap is treated with sodium cyanide solution or, with sodium cyanide solution in the presence of said catalyst.

7. The method according to claim 1, wherein 2–7% by weight catalyst relative to total sulfur is added.

8. The method according to claim 1, wherein said reaction mixture is agitated while air is being passed through it.

9. The method according to claim 1, wherein the selective oxidation of the sulfidic sulfur is carried out at 50°–80° C.

10. The method according to claim 1, wherein said solution of said sodium thiocyanate product also contains sodium hydroxide and further comprising contacting said solution with carbon dioxide to thereby precipitate sodium carbonate and removing said precipitate from said product solution.

11. The method according to claim 10, wherein said carbon dioxide is passed through or blown into said solution.

12. The method according to claim 1, further comprising cooling wherein said solution of said sodium thiocyanate product also contains sodium hydroxide and further comprising contacting said solution with carbon dioxide to thereby precipitate sodium carbonate and removing said precipitate form said product solution.

* * * * *